US009008965B2

United States Patent
Kitatani (10) Patent No.: US 9,008,965 B2
(45) Date of Patent: Apr. 14, 2015

(54) POSITION MEASUREMENT DEVICE, METHOD FOR GENERATING LOCATIONAL INFORMATION, AND STORAGE MEDIUM

(75) Inventor: Kenichi Kitatani, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 192 days.

(21) Appl. No.: 13/637,229

(22) PCT Filed: Mar. 25, 2011

(86) PCT No.: PCT/JP2011/057443
§ 371 (c)(1),
(2), (4) Date: Sep. 25, 2012

(87) PCT Pub. No.: WO2011/118806
PCT Pub. Date: Sep. 29, 2011

(65) Prior Publication Data
US 2013/0024116 A1 Jan. 24, 2013

(30) Foreign Application Priority Data
Mar. 26, 2010 (JP) .................................. 2010-072972

(51) Int. Cl.
*G01C 21/20* (2006.01)
*G01C 21/34* (2006.01)
(Continued)

(52) U.S. Cl.
CPC ................. *G01C 21/20* (2013.01); *H04W 4/02* (2013.01); *G06Q 10/04* (2013.01); *G06Q 50/00* (2013.01);
(Continued)

(58) Field of Classification Search
CPC .... G01C 21/00; G01C 21/20; G01C 21/3679;
G01C 21/3484; G06Q 50/00; G06Q 10/047;
G06Q 10/04; G08G 1/00; G08G 1/13; H04W 4/028; H04W 4/025; H04W 4/02
USPC ............. 701/521, 41, 468, 428, 50, 150, 301, 701/450, 1, 532, 469, 408, 451, 19, 454, 701/457, 540, 533, 300; 455/456.1, 457, 4, 455/411, 410
See application file for complete search history.

(56) References Cited

U.S. PATENT DOCUMENTS

| 6,980,814 | B2 * | 12/2005 | Nohara et al. ............. 455/456.1 |
| 7,856,311 | B2 * | 12/2010 | Matsuura et al. ............. 701/540 |
| 2002/0049063 | A1 * | 4/2002 | Nohara et al. ................ 455/456 |

FOREIGN PATENT DOCUMENTS

| JP | 11-183996 A | * | 7/1999 |
| JP | 2007-279853 A | | 10/2007 |

(Continued)

OTHER PUBLICATIONS

International Search Report for PCT/JP2011/057443; issued Jun. 7, 2011; 2 pages.

*Primary Examiner* — Russell Frejd (57) ABSTRACT

In position measurement device, a positional data acquirer measures a present position to acquire positional data. A positional data storage sequentially stores the positional data acquired by the positional data acquirer. A determiner determines, on the basis of the positional data sequentially stored by the positional data storage and a predetermined criterion, whether a position of a user at a present time is a position of a location to be recorded. And, a locational information storage stores, if the determiner determines that the position of the user at the present time is the position of the location to be recorded, the positional data of the position as locational information.

7 Claims, 4 Drawing Sheets

(51) Int. Cl.
*G01C 21/36* (2006.01)
*H04W 4/02* (2009.01)
*G06Q 10/04* (2012.01)
*G06Q 50/00* (2012.01)
*G01C 21/00* (2006.01)

(52) U.S. Cl.
CPC ............ *G01C 21/00* (2013.01); *G01C 21/3484* (2013.01); *G01C 21/3679* (2013.01); *G06Q 10/047* (2013.01); *H04W 4/028* (2013.01)

(56) References Cited

FOREIGN PATENT DOCUMENTS

JP  2007-309843 A  *  11/2007
JP  2009-139196 A  *  6/2009
JP  2009-168473 A  *  7/2009

* cited by examiner

| POSITIONAL DATA | EAST LONGITUDE:XXX NORTH LATITUDE:XXX | EAST LONGITUDE:YYY NORTH LATITUDE:YYY | EAST LONGITUDE:ZZZ NORTH LATITUDE:ZZZ | ... |
|---|---|---|---|---|
| TIME AND DATE | JAN. 1, 2011 12:12 | JAN. 1, 2011 12:13 | JAN. 1, 2011 12:14 | ... |

| POSITIONAL DATA | TIME AND DATE |
|---|---|
| EAST LONGITUDE:AAA<br>NORTH LATITUDE:AAA | JAN. 1, 2011<br>12:12 |

FIG. 5B

| POSITIONAL DATA | SIZE OF AREA OF STAY |
|---|---|
| EAST LONGITUDE:BBB<br>NORTH LATITUDE:BBB | SMALL |
| EAST LONGITUDE:CCC<br>NORTH LATITUDE:CCC | MEDIUM |
| EAST LONGITUDE:DDD<br>NORTH LATITUDE:DDD | LARGE |

FIG. 5C

| POSITIONAL DATA | USAGE HISTORY |
|---|---|
| EAST LONGITUDE:EEE<br>NORTH LATITUDE:EEE | DIGITAL CAMERA "XXX" |
| EAST LONGITUDE:FFF<br>NORTH LATITUDE:FFF | ENTERING AND LEAVING MANAGEMENT SYSTEM OF "YY" UNIVERSITY |
| EAST LONGITUDE:GGG<br>NORTH LATITUDE:GGG | DIGITAL CAMERA FUNCTION |

POSITION MEASUREMENT DEVICE, METHOD FOR GENERATING LOCATIONAL INFORMATION, AND STORAGE MEDIUM

This application is the National Phase of PCT/JP2011/057443 filed Mar. 25, 2011, which claims priority to Japanese Application No. 2010-072972 filed Mar. 26, 2010, the disclosures of which are hereby incorporated by reference in their entirety.

TECHNICAL FIELD

The present invention relates to a position measurement device, a method for generating locational information and a storage medium to measure a position and using positional data, using the global positioning system (GPS) or the like, to generate locational information to be recorded.

BACKGROUND ART

A device has been proposed that performs position measurement using a GPS device to acquire a detailed history of a user's behavior, and provides various services on the basis of the acquired history information.

A system disclosed in Patent Literature 1, for example, always measures a present position of a user to specify a movement area of the user, a time spent by the user in the area and the like. This system decides contents to be distributed on the basis of the movement area and the time spent in the area and provides the contents to the user.

PRIOR ART LITERATURE

Patent Literature

Patent Literature 1: Unexamined Japanese Patent Application Kokai Publication No. 2007-279853

DISCLOSURE OF THE INVENTION

Problems to be Solved by the Invention

Of a large volume of positional data (latitude, longitude and the like) recorded by a position measurement device as described above, only part of positional data is useful for a user. For example, positional data regarding shops and facilities that were used by a user in going out is useful for the user whereas positional data and/or the like of a place a user passes through is often unnecessary for the user.

However, a method to differentiate a small volume of useful positional data and a large volume of unnecessary positional data did not exist.

If positional data of a location to be recorded (useful and important for a user) can be extracted from a large volume of positional data, information on the (useful) location to be recorded can be effectively utilized for various functions and services such as navigation.

The present invention was made in view of the above problem and has an objective to provide an art to extract positional data to be recorded from positional data.

The present invention also has an objective to provide a position measurement device and a method to generate locational information that allows for easy and efficient generation of locational information to be recorded, as well as a storage medium.

Means for Solving the Problems

In order to achieve the above objectives, a position measurement device according to a first aspect of the present invention comprises:

positional data acquisition means configured to measure a present position to acquire positional data;

positional data storage means configured to sequentially store the positional data acquired by the positional data acquisition means;

determination means configured to determine, on the basis of the positional data sequentially stored by the positional data storage means and a predetermined criterion, whether a position of a user at a present time is a position of a location to be recorded; and locational information storage means configured to store, if the determination means determines that the position of the user at the present time is the position of the location to be recorded, the positional data of the position as locational information.

A method for generating locational information according to a second aspect of the present invention comprises:

a measurement step to sequentially store positional data obtained by measuring a present position in a data storage area;

a determination step to determine, on the basis of the positional data sequentially stored in the data storage area, whether a position of a user at a present time is a position of a location to be recorded; and a locational information step to store, if determined that the position of the user at the present time is the position of the location to be recorded, the positional data of the position as locational information in the data storage area.

A computer-readable storage medium according to a third aspect of the present invention having stored a program executable by a computer, causing the computer to perform:

a positional data acquisition step to measure a present position to acquire positional data;

a positional data storage step to sequentially store the positional data acquired at the positional data acquisition step;

a determination step to determine, on the basis of the positional data sequentially stored at the positional data storage step, whether a position of a user at a present time is a position of a location to be recorded; and a locational information step to store, if determined that the position of the user at the present time is the position of the location to be recorded, the positional data of the position as locational information.

Effects of the Invention

In the present invention, by using records of measured result of present positions sequentially acquired, locational information to be recorded can be easily and efficiently generated.

MODE FOR CARRYING OUT THE INVENTION

Hereinafter, an embodiment of the present invention will be described with reference to drawings. In the drawings, an identical or corresponding section has the same reference numeral.

Figure 1:
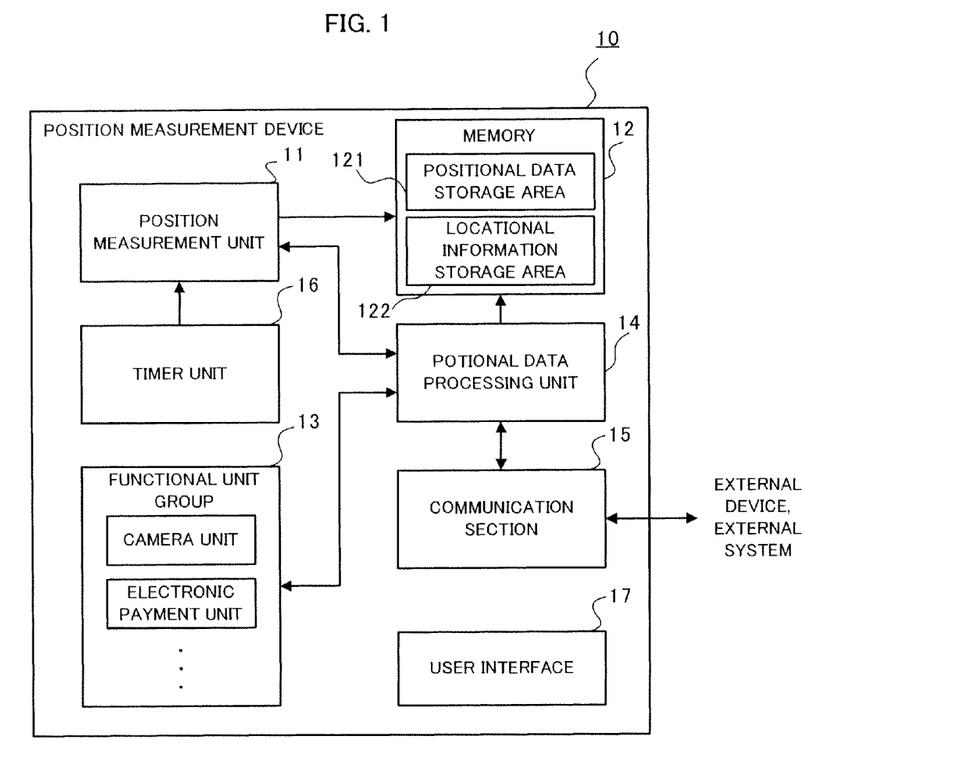
FIG. 1 is a functional block diagram of a position measurement device according to an embodiment of the present invention.

First, a configuration of a position measurement device 10 according to an embodiment of the present invention will be described with reference to FIG. 1. As illustrated, the position measurement device 10 includes a position measurement unit 11, a memory 12, a functional unit group 13, a positional data processing unit 14, a communication unit 15, a timer unit 16 and a user interface 17. The position measurement device 10 is mounted on the body of a device such as a navigation device, a mobile communication terminal and the like.

Figure 2:
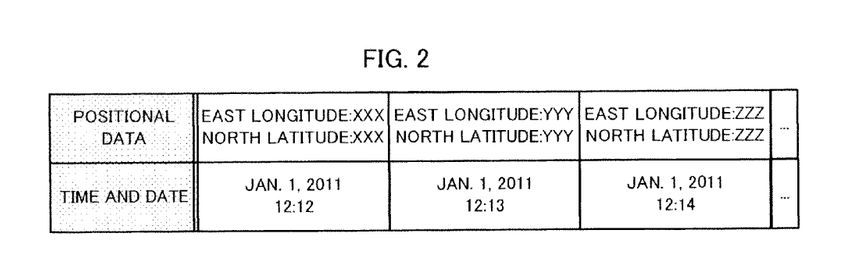
FIG. 2 is a table showing an example of information stored in a positional data storage area according to an embodiment.

The position measurement unit 11 measures a position of the position measurement device 10 to acquire positional data indicating the longitude, latitude, altitude and the like thereof. Then, the position measurement unit 11 sequentially stores the acquired positional data associated with time and date data (time and date) acquired from the timer unit 16 in a positional data storage area 121 of the memory 12, as shown in FIG. 2. The position measurement unit 11 includes, for example, a global positioning system (GPS) receiving circuit, which receives electric waves from, for example, a GPS satellite, and measures a position of the position measurement device 10 on the basis of the received electric waves.

The memory 12 is physically composed of a read only memory (ROM), a random access memory (RAM), and/or the like. The memory 12 functionally includes an area for sequentially storing positional data acquired by the position measurement unit 11 and time and date data in association with each other (positional data storage area 121), and an area for storing locational information generated by the positional data processing unit 14 (locational information storage area 122). The memory 12 stores a program, various data and the like for realizing the positional data processing unit 14.

The memory 12 stores distance threshold values R1 to R3 and time threshold values T1 to T3, the both threshold values being used for determining whether a user stays in locational information generation process, which will be described later. The threshold values are set such that, for example, R3>R2>R1, T3>T2>T1. These threshold values can be arbitrarily set by a user.

The functional unit group 13 indicates a group of a plurality of functional units included in the position measurement device 10. The functional units, each includes each unit for realizing each function. Examples of the respective functional units of the functional unit group 13 include a camera unit, electronic payment unit, voice communication unit, music reproduction unit, television unit, unit for exchanging personal information and the like, browser unit, mail unit and the like. The camera unit is, composed of, for example, a built-in camera unit and a control unit to control the built-in camera unit. The electronic payment unit is composed of, for example, an electro payment unit and a control unit to control the electro payment unit. The voice communication unit is composed of, for example, a voice communication unit and a control unit to control the voice communication unit. A music reproduction unit is composed of, for example, a music reproduction unit and a control unit to control the music reproduction unit. The television unit is composed of, for example, a television receiver, a control unit to control the television receiver and the user interface 17. The unit for exchanging personal information and the like, browser unit and mail unit, each is composed of a control unit, a program and the user interface 17. The control unit is realized in such a way that a central processing unit (CPU), which controls the entire position measurement device 10, reads out a program stored in the memory 12 and executes the program.

The positional data processing unit 14 is realized in such a way that an unillustrated CPU reads out a program stored in the memory 12 and executes the program. The positional data processing unit 14 determines whether positional data the position measurement unit 11 has sequentially stored in the memory 12 indicates a position of a location to be recorded (a location useful for a user). If the location is a location to be recorded, the positional data processing unit 14 records positional data thereof in the locational information storage area 122 of the memory 12 (locational information generation process).

If the positional data processing unit 14 determines that a user stays in one area for over a predetermined time, the positional data processing unit 14 determines the area as a location to be recorded. The positional data processing unit 14 also detects a use of functional unit group 13, a use of a predetermined external device via the communication unit 15, or a use of a predetermined service provided by an external computer system. If the use is detected, the positional data processing unit 14 determines a location at the time of the use as a location to be recorded. Then, the positional data processing unit 14 records, as locational information, positional data of the location determined as a useful location as well as a measurement time thereof in the memory 12. Details of locational information generation process will be described later.

The communication unit 15 is composed of an interface and/or like to control communication with the external, and communicates with other devices and systems via wired or wireless communication.

The timer unit 16 measures a present time.

The user interface 17 includes a display unit and an operation unit such as a keyboard. The display unit displays various types of information. The operation unit includes a keyboard and inputs various instructions and data. The user interface 17 may be included in the functional unit group 13.

Next, processing operation of the position measurement device 10 will be described.

Figure 3:
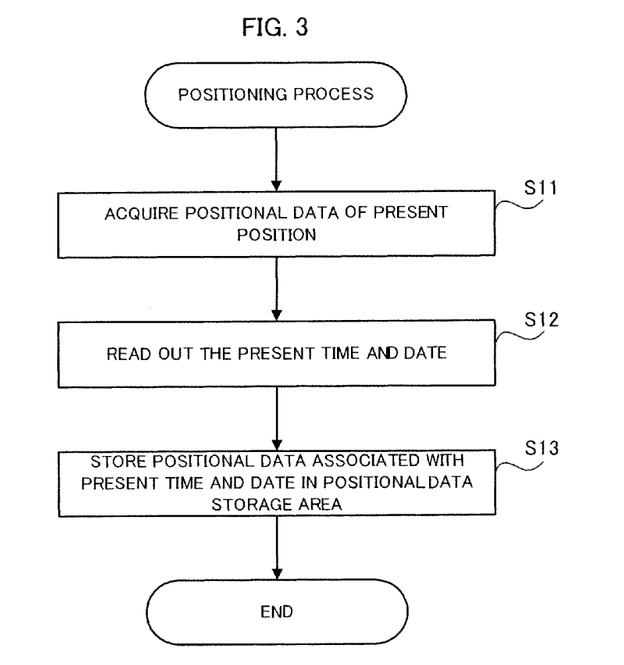
FIG. 3 is a flow chart for describing positioning process according to an embodiment.

When the position measurement device 10 is powered on or an instruction to start positioning process is inputted via the user interface 17, the position measurement unit 11 performs positioning process shown in the flow chart of FIG. 3 every time a predetermined time has passed (for example, every one second).

At the start of positioning process, the positioning measurement section 11 uses the GPS receiving circuit to measure a position, thereby acquiring positional data indicating a position of the position measurement device 10 (Step S11).

Next, the position measurement unit 11 acquires the present time and date from the timer unit 16 (Step S12), and stores the measured present position and the present time and date in association with each other in the positional data storage area 121 in the memory 12 (Step S13). At this step, if there is no space in the positional data storage area 121, the position measurement unit 11 deletes (writes over) the oldest record to record the positional data and present time and date.

In this way the position measurement unit 11 repeatedly performs positioning process, thereby sequentially storing a pair of positional data indicating the present position of the position measurement device 10 and the present time and date.

Next, the locational information generation process performed by the positional data processing unit 14 will be described.

Figure 4:
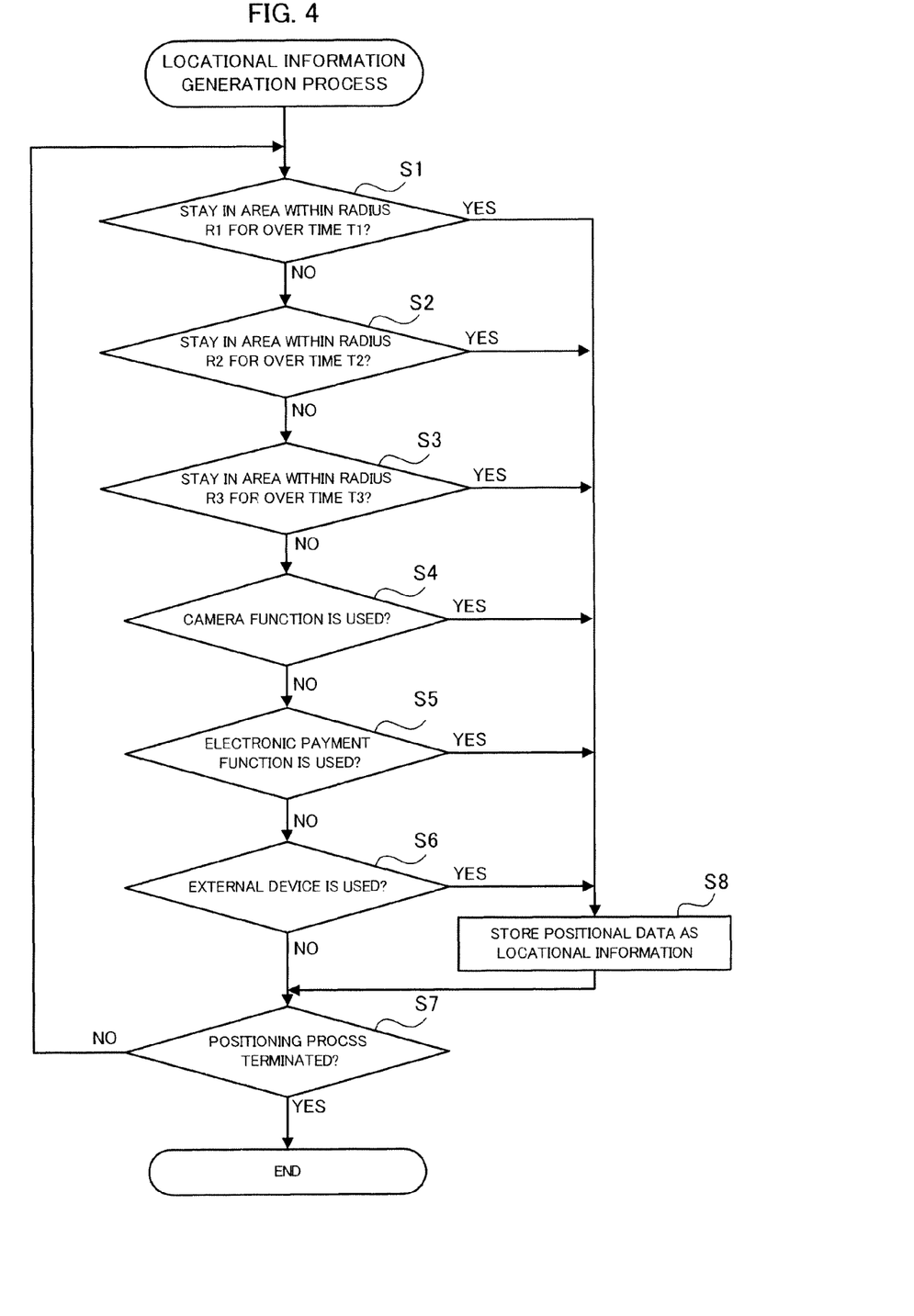
FIG. 4 is a flow chart for describing locational information generation process according to an embodiment.

In response to (in synchronization with) start of positioning process by the position measurement unit 11 as described above, the positional data processing unit 14 performs locational information generation process shown in the flow chart of FIG. 4.

When locational information generation process is started, the positional data processing unit 14, first, determines whether the position measurement device 10 stays within an area of a radius R1 for over a time T1 (Step S1).

Specifically, the positional data processing unit 14 refers to positional data of the present position most recently stored and time and date data associated therewith, of data sequentially stored in the positional data storage area 121 in the memory 12. The positional data processing unit 14 determines whether all positions indicated by all positional data acquired for the past time T1 up to the present time are within an area of the radius R1 of the position at the present time.

Then, if all positions indicated by all positional data acquired from the past time T1 until the present time are within an area of the radius R1 of the position at the present time, the positional data processing unit 14 determines that the body of the position measurement device 10 stays within the area of the radius R1 for over the time T1 (Step S1: YES). In this case, the position of the present time is determined to be a position of a location to be recorded, and the positional data processing unit 14 stores measured data most recently stored in the positional data storage area 121, as locational information, in the locational information storage area 122 in the memory 12 (Step S8).

At Step S1, if it is determined that the position measurement device 10 does not stay within an area of the radius R1 for over the time T1 (Step S1: NO), the positional data processing unit 14 determines whether the position measurement device 10 stays within an area of a radius R2 (for example, R2>R1) for over a time T2 (for example T2>T1) (Step S2). A specific determination method is the same as that of Step S1.

Specifically, the positional data processing unit 14 refers to positional data of the present position most recently stored and time and date data associated therewith, of data sequentially stored in the positional data storage area 121 in the memory 12. The positional data processing unit 14 determines whether all positions indicated by all positional data acquired for the past time T2 up to the present time are within an area of the radius R2 of the position at the present time.

Then, if the position measurement device 10 stays within the area of the radius R2 for over the time T2 (Step S2: YES), the positional data processing unit 14 determines that the position is a position of a location to be recorded. In this case, the positional data processing unit 14 stores measured data most recently stored, as locational information, in the positional data storage area 121 in the locational information storage area 122 in the memory 12 (Step S8).

At Step S2, if the positional data processing unit 14 determines that the position measurement device 10 does not stay within an area of the radius R2 for over the time T2 (Step S2: NO), the positional data processing unit 14 determines whether the position measurement device 10 stays within an area of a radius R3 (for example, R3>R2) for over a time T3 (for example, T3>T2) (Step S3). A specific determination method is the same as those of Steps S1 and S2.

If the positional data processing unit 14 determines that the body of the position measurement device 10 stays within an area of the radius R3 for over the time T3 (Step S3: YES), the positional data processing unit 14 determines that the position is a position of a location to be recorded. In this case, the positional data processing unit 14 stores measured data most recently stored, as locational information, in the locational information storage area 122 in the memory 12 (Step S8).

At Step S3, if the positional data processing unit 14 determines that the position measurement device 10 does not stay in an area of the radius R3 for over the time T3 (Step S3: NO), the positional data processing unit 14 determines whether the camera function of the position measurement device 10 is used (Step S4).

Specifically, the positional data processing unit 14 determines whether the camera unit of the functional unit group 13 is in operation, and if the camera unit is in operation, it is determined that the camera function is used. If it is determined that the camera function is used (Step S4: YES), the positional data processing unit 14 determines the position as a position of a location to be recorded. In this case, the positional data processing unit 14 stores measured data most recently stored, as locational information, in the locational information storage area 122 in the memory 12 (Step S8).

At Step S4, if it is determined that the camera function of the position measurement device 10 is not used (Step S4: NO), the positional data processing unit 14, next, determines whether the electronic payment function of the position measurement device 10 is used (Step S5).

Specifically, the positional data processing unit 14 determines whether the electronic payment unit of the functional unit group 13 is activated. If the electronic payment unit is activated, the positional data processing unit 14 determines that the electronic payment function is used. If it is determined that the electronic payment function is used (Step S5: YES), the positional data processing unit 14 determines the position as a position of a location to be recorded. In this case, the positional data processing unit 14 stores measured data most recently stored, as locational information, in the locational information storage area 122 in the memory 12 (Step S8).

At Step S5, it is determined that the electronic payment function of the position measurement device 10 is not used (Step S5: NO), the positional data processing unit 14, next, determines whether an external device such as a digital camera is used (Step S6).

Specifically, the positional data processing unit 14 inquires of the communication unit 15 whether an external device such as a digital camera is on and connected to the position measurement device 10. As a result of the inquiry, if an external device is on and connected, the positional data processing unit 14 determines that the external device is used. Then, if it is determined that a digital camera is used (Step S6: YES), the positional data processing unit 14 determines the position as a position of a location to be recorded. In this case, the positional data processing unit 14 stores measured data most recently stored, as locational information, in the locational information storage area 122 in the memory 12 (Step S8).

At Step S6, if it is determined that an external device is not used (Step S6: NO) or if record of locational information is completed at Step S8, the positional data processing unit 14 determines whether positioning process in the position measurement unit 11 has been terminated (Step S7). If positioning process has been terminated (Step S7: YES), locational information generation process is terminated. If positioning process is not terminated (Step S7: NO), the flow of processing returns to Step S1 and the above positioning process will continue.

As described above, in the position measurement device 10 according to the present embodiment, if a user stays within a certain area for over a certain time, the area is determined to be a location where the user uses a shop, facility or the like, and a position of the location is automatically recorded. In the position measurement device 10, use of the record of positional data sequentially acquired allows for easy and efficient generation of locational information to be recorded.

In addition, if a function of the position measurement device 10 or an external device is used or if a predetermined service is used, then locational information useful for a user is efficiently generated by automatically recording positional data at the time of the use.

Since positional data useful for a user is extracted and stored, the position measurement device 10 does not need to store all of a large volume of positional data. Accordingly, the position measurement device 10 uses less memory. In the position measurement device 10, in developing a function to utilize positional data and an application and the like, not all positional data needs to be analyzed, facilitating the development.

Various modifications and applications of the above embodiment can be employed. For example, determination conditions for recording the above locational information is only an example and can be arbitrarily changed. Other examples of determination conditions include a condition in which if a voice communication function, browser function or the like in the functional unit group 13 is used or if an external device such as a mobile phone, car navigation device, personal computer and the like is used via the communication unit 15, a position of the location is determined to be an important location. A configuration can be employed in which if it is detected that a service provided via the communication unit 15 by an external computer system such as ticket systems of public transportation, an entering and leaving management system of school or corporation and the like is used, the location is determined to be an important location.

In the above embodiment, three pairs of threshold values R of size of an area and threshold values T of stay time are used to determine whether the user stays or not in areas having three different sizes (FIG. 4: Steps S1 to S3). Areas to be determined are not limited to these. A configuration can be employed in which more threshold values are used to determine whether a user stays or not in more areas whose sizes are different to one another.

The threshold values R and stay time threshold values T can be set, assuming that a stay time is short in a small area such as shops and a stay time is long in a large area such as towns. Specific examples of setting performed in such an assumption include the followings. In order to determine stay within an small area in the first processing for determining stay (Step S1), R1 and T1 are set to be several meters and several seconds, respectively; in order to determine stay within a larger area in a subsequent processing for determining stay (Step S2), R2 and T2 are set to be several hundred meters and several minutes, respectively; and in order to determine stay within a further larger area in the last processing for determining stay (Step S3), R3 and T3 are set to be several kilometers and several hours, respectively.

Figure 5A:
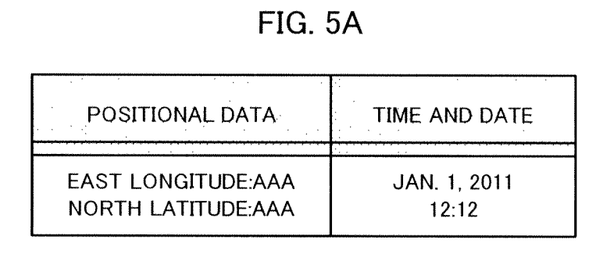
FIG. 5 is a table illustrating an example of locational information according to an embodiment.

In the above embodiment, positional data alone is stored, as locational information, in the locational information storage area 122. However, positional data may be stored together with time and date data stored in the positional data storage area 121 in association with the positional data, as locational information. FIG. 5A is an example of locational information stored in this way. In such a configuration, since a position of a location important for a user, as well as time and date when the user stays in the location are recorded, locational information can be utilized more effectively, later.

Figure 5B:
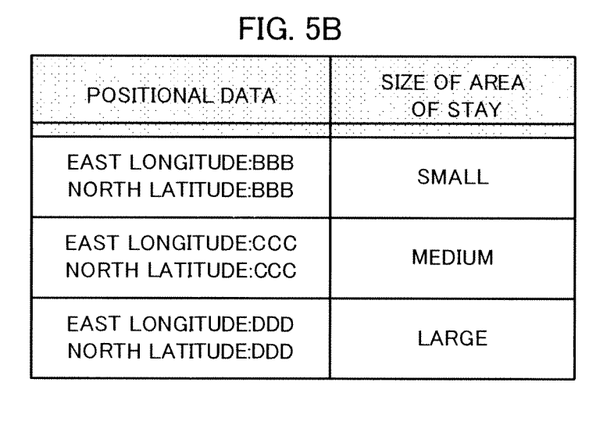

Information recorded with positional data is not limited to time and date. If it is determined that a user stays in an area having a certain size and locational information is recorded, then information indicating a size of an area of stay may be added to locational information and stored. Specifically, a message indicating a size of the area of stay is added to positional data in such a way that "small" is added to locational information that is determined to be YES and recorded at Step S1, "medium" is added to locational information that is determined to be YES and recorded at Step S2, and "large" is added to locational information that is determined to be YES and recorded at Step S3. FIG. 5B is an example of locational information generated in this way. This locational information is stored in the locational information storage area 122. In such a configuration, since a size of an area of stay is recorded with a position of a location to be recorded, locational information can be utilized more effectively, later.

At this time, a location where a user stays may be specified according to a size of an area of stay and stored. For example, if it is determined that a user stays in a "large" area, a name of a "large" region or location is detected by referring to map data and stored in association with the user's position in map data. Specifically, a place or facility name corresponding to one location include a town name, an intersection name, a place name such as a river and seashore, a shop name and the like, all of which has a different size. In the above map data, each place name and facility name in association with its corresponding size is stored. If a user stays in a location as a "large" area, "large" place name and facility name is stored in association with the location. If a user stays in a location as a "small" area, each "small" place name and facility name is stored in association with the location.

Sizes corresponding to place names and facility names include the following examples.

Place names include a name of a street, a name of a seashore, mountain, lake or the like, a name of a sightseeing spot, historic site or the like, a nearest station, a town, a ward, a city, a county, a prefecture, a state, a province and a country. In these place names, an area corresponding to a name of a street is the smallest, and an area corresponding to a name of a country is the largest.

Facility names include a restaurant, a station of public transportation, and a leisure facility such as a theme park, a shopping mall, an amusement park, a park and the like. In these facility names, an area corresponding to a restaurant is the smallest, and an area corresponding to a park or a theme park is the largest.

Figure 5C:
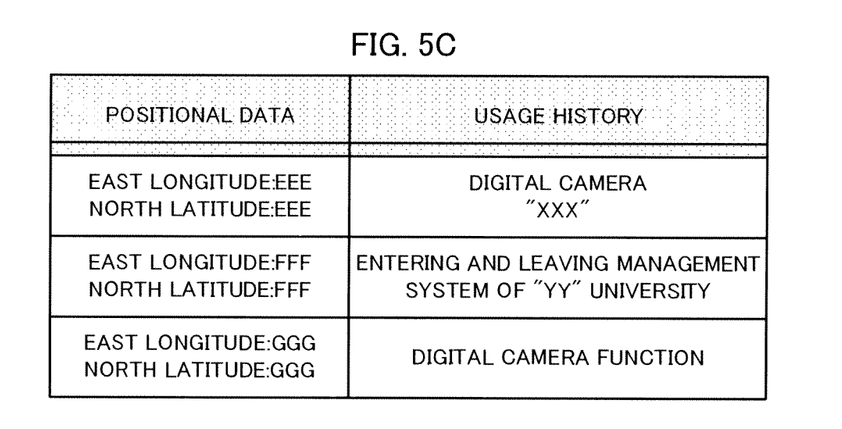

Further, by adding usage history information to positional data, the both may be stored as locational information. The usage history information indicates a history of using a predetermined function, external device, service and/or the like. The usage history information is represented by, for example, a name of the predetermined function, external device and service. If a predetermined function, external device, service and/or the like is used (at Step S4, S5 or S6: YES) and locational information is recorded, then the usage history information is recorded in locational information. FIG. 5C is an example of locational information stored in this way. In such a configuration, since not only a position of a location important for a user but also a device and/or service used in the location are recorded, locational information can be utilized more effectively, later.

The position measurement device 10 may include a configuration, as needed, in which locational information stored in this way is displayed to a user in an unillustrated display unit, thereby reminding the user.

Locational information generated by the position measurement device 10 can be used in various applications, services and devices that use positional information. Specific applications include a case where a navigation device connected to the position measurement device 10 uses locational information. In this case, the navigation device uses, as a destination candidate, locational information stored in the locational information storage area 122 of the memory 12 in the position measurement device 10.

Specifically, the navigation device can be configured so that when a user leaves home for a destination, navigation is automatically started, assuming that a location (locational information) near a route which the user passes through is a destination. In predicting a destination, a plurality of location candidates (locational information) near the route which the user is passing through may be listed from the locational information storage area 122 and displayed on a screen in the unillustrated display unit, enabling the user to select the destination.

At this time, in displaying the candidates, positional data indicated by locational information, as well as a place name, facility name, shop name or the like associated with the positional data may be retrieved from database in the navigation device and displayed.

As a variation of the present embodiment, a configuration is provided in which the position measurement device 10 and a car navigation device are connected and positional data of the both are recorded by the both communication means thereof. In this configuration, locational information recorded by the both of a car and the position measurement device 10 can be used, realizing a more convenient navigation function. As a specific example, the position measurement device 10 has a navigation function, and accordingly when a user goes to a shop or facility by train to which a user has driven, the position measurement device 10 can automatically start navigation to the destination.

Examples of an application, service and device using the above position information are as follows:

Example 1

An application that stores a photograph, position information where the photograph is taken, and both or either of a place name and a facility name corresponding to the position information where the photo is taken in association with one another In this application, when a user displays the photograph, the position and the place name and/or facility name associated with the photograph are also displayed.

Example 2

An application or service that, when a user posts data of a text, image, voice, photograph, animation or combination thereof to a blog site, micro blog site, SNS site or the like, stores the posted content by associating with at least one of position information and a place and/or facility name.

In this service, when a user or other audiences displays the posted content, the position information and place and/or facility name associated with the posted content are also displayed.

The position measurement device 10 does not require a dedicated device, but can be realized by a common mobile terminal, computer or the like that has a positioning function. For example, the position measurement device 10 may be configured in such a way that a program for performing the above operation is stored and distributed in a computer-readable storage medium (for example, FD, CD-ROM, DVD), and the program is installed into a mobile terminal with a GPS function. Or, the program may be stored in a disk of a server device on a network such as the Internet, and be downloaded to, for example, a mobile terminal.

Part or all of the above embodiment can be described as the followings, but is not limited to the followings.

(Additional Statement 1)

A position measurement device comprising:

positional data acquisition means configured to measure a present position to acquire positional data;

positional data storage means configured to sequentially store the positional data acquired by the positional data acquisition means;

determination means configured to determine, on the basis of the positional data sequentially stored by the positional data storage means and a predetermined criterion, whether a position of a user at a present time is a position of a location to be recorded; and locational information storage means configured to store, if the determination means determines that the position of the user at the present time is the position of the location to be recorded, the positional data of the position as locational information.

(Additional Statement 2)

The position measurement device according to additional statement 1, wherein the determination means determines, on the basis of the positional data sequentially stored by the positional data storage means and the predetermined criterion, whether a user stays within a predetermined size of area for over a predetermined time, and determines, if determined that the user stays within the predetermined size of area, that the position of the user at the present time is the position of the location to be recorded.

(Additional Statement 3)

The position measurement device according to additional statement 2, wherein the determination means determines whether a user stays for over a predetermined time in each of a plurality of areas, each having a different size, wherein the determinations being performed using each of a plurality of predetermined conditions corresponding to each of the plurality of areas.

(Additional Statement 4)

The position measurement device according to any one of additional statements 1 to 3, wherein the determination means determines, if detected a use of a predetermined function of the position measurement device, that the position of the user at the present time is the position of the location to be recorded.

(Additional Statement 5)

The position measurement device according to any one of additional statements 1 to 3, wherein the determination means determines, if detected a use of an external device connected to the position measurement device, that the position of the user at the time of the use is the position of the location to be recorded.

(Additional Statement 6)

The position measurement device according to any one of additional statements 1 to 3, wherein the determination means deter mines, if detected a use of a predetermined service provided by an external computer system, the position of the user at the time of the use is the position of the location to be recorded.

(Additional Statement 7)

The position measurement device according to any one of additional statements 1 to 3, wherein if detected any one or more uses a use of external device connected to the position measurement device, a use of a predetermined function of the position measurement device, and a use of a predetermined service provided by an external computer system, the determination means determines that the position of the user at the time of the use is the position of the location to be recorded; and the locational information storage means stores, as locational information, history information indicative of the detected use of the predetermined function, the external device or the predetermined service together with positional data at the time of the use.

(Additional Statement 8)

A method for generating locational information including:

a measurement step to sequentially store positional data obtained by measuring a present position in a data storage area;

a determination step to determine, on the basis of the positional data sequentially stored in the data storage area, whether a position of a user at a present time is a position of a location to be recorded; and a locational information step to store, if determined that the position of the user at the present time is the position of the location to be recorded, the positional data of the position as locational information in the data storage area.

(Additional Statement 9)

A computer-readable storage medium having stored a program executable by a computer, causing the computer to perform:

a positional data acquisition step to measure a present position to acquire positional data;

a positional data storage step to sequentially store the positional data acquired at the positional data acquisition step;

a determination step to determine, on the basis of the positional data sequentially stored at the positional data storage step, whether a position of a user at a present time is a position of a location to be recorded; and a locational information step to store, if determined that the position of the user at the present time is the position of the location to be recorded, the positional data of the position as locational information.

The present application is based on Japanese Patent Application No. 2010-072972 filed on Mar. 26, 2010. The entire specification, claims and drawings of Japanese Patent Application No. 2010-072972 is incorporated herein by reference.

DESCRIPTION OF REFERENCE NUMERALS

10 Position measurement device
11 Position measurement unit
12 Memory
121 Positional data storage area
122 Locational information storage area
13 Functional unit group
14 Positional data processing unit
15 Communication unit
16 Timer unit
17 User interface

The invention claimed is:

1. A position measurement device comprising:
a positional data acquirer configured to measure a present position to acquire positional data;
a positional data storage configured to sequentially store the positional data acquired by the positional data acquirer;
a determiner configured to determine, on the basis of the positional data sequentially stored by the positional data storage and a predetermined criterion, whether a position of a user at a present time is a position of a location to be recorded; and
a locational information storage configured to store, when the determiner determines that the position of the user at the present time is the position of the location to be recorded, the positional data of the position as locational information,
wherein the determiner is configured to determine, on the basis of the positional data sequentially stored by the positional data storage and the predetermined criterion, whether a user stays within a predetermined size of area for over a predetermined time, and determine, when determined that the user stays within the predetermined size of area, that the position of the user at the present time is the position of the location to be recorded, and
wherein the determiner is configured to determine whether a user stays for over a predetermined time in each of a plurality of areas, each having a different size, wherein the determinations are performed using each of a plurality of predetermined conditions corresponding to each of the plurality of areas.

2. The position measurement device according to claim 1, wherein the determiner is configured to determine, when a use of a predetermined function of the position measurement device is detected, that the position of the user at the present time is the position of the location to be recorded.

3. The position measurement device according to claim 1, wherein the determiner is configured to determine, when a use of an external device connected to the position measurement device is detected, that the position of the user at the time of the use is the position of the location to be recorded.

4. The position measurement device according to claim 1, wherein the determiner is configured to determine, when a use of a predetermined service provided by an external computer system is detected, the position of the user at the time of the use is the position of the location to be recorded.

5. The position measurement device according to claim 1, wherein when any one or more uses of a use of external device connected to the position measurement device, a use of a predetermined function of the position measurement device, and a use of a predetermined service provided by an external computer system is detected, the determiner is configured to determine that the position of the user at the time of the use is the position of the location to be recorded; and
the locational information storage is configured to store, as locational information, history information indicative of the detected use of the predetermined function, the external device, or the predetermined service together with positional data at the time of the use.

6. A method for generating locational information comprising:
a measurement step to sequentially store positional data obtained by measuring a present position in a data storage area;
a determination step to determine, on the basis of the positional data sequentially stored in the data storage area, whether a position of a user at a present time is a position of a location to be recorded; and
a locational information step to store, if determined that the position of the user at the present time is the position of the location to be recorded, the positional data of the position as locational information in the data storage area,
wherein, at the determination step, a determiner determines, on the basis of the positional data sequentially stored in the data storage area, whether a user stays within a predetermined size of area for over a predetermined time, and determines, when determined that the user stays within the predetermined size of area, that the position of the user at the present time is the position of the location to be recorded, and wherein, at the determination step, the determiner determines whether a user stays for over a predetermined time in each of a plurality of areas, each having a different size, wherein the determinations is performed using each of a plurality of predetermined conditions corresponding to each of the plurality of areas.

7. A computer-readable non-transitory storage medium having stored a program executable by a computer, causing the computer to perform:

a positional data acquisition step to measure a present position to acquire positional data;

a positional data storage step to sequentially store the positional data acquired at the positional data acquisition step;

a determination step to determine, on the basis of the positional data sequentially stored at the positional data storage step, whether a position of a user at a present time is a position of a location to be recorded; and a locational information step to store, if determined that the position of the user at the present time is the position of the location to be recorded, the positional data of the position as locational information, wherein, at the determination step, a determiner determines, on the basis of the sequentially stored positional data, whether a user stays within a predetermined size of area for over a predetermined time, and determines, when determined that the user stays within the predetermined size of area, that the position of the user at the present time is the position of the location to be recorded, and wherein, at the determination step, the determiner determines whether a user stays for over a predetermined time in each of a plurality of areas, each having a different size, wherein the determinations are performed using each of a plurality of predetermined conditions corresponding to each of the plurality of areas.

* * * * *